Fig. 3.

INVENTORS
STANLEY H. HUNKINS,
PETER W. BERESIN &
ROBERT S. SINN
BY
*Millman and Jacobs*
ATTORNEYS Dec. 19, 1967 S. H. HUNKINS ET AL 3,359,541
DATA RETRIEVAL SYSTEM HAVING PLURAL ADDRESSED
REMOTE REQUEST STATIONS
Filed Dec. 30, 1963 4 Sheets-Sheet 3

INVENTORS
STANLEY H. HUNKINS,
PETER W. BERESIN &
ROBERT S. SINN
BY
*Millman and Jacobs*
ATTORNEYS Dec. 19, 1967  S. H. HUNKINS ET AL  3,359,541
DATA RETRIEVAL SYSTEM HAVING PLURAL ADDRESSED
REMOTE REQUEST STATIONS
Filed Dec. 30, 1963  4 Sheets-Sheet 4

Fig. 4.

INVENTORS
STANLEY H. HUNKINS,
PETER W. BERESIN &
ROBERT S. SINN
BY
Millman and Jacobs
ATTORNEYS United States Patent Office 3,359,541
Patented Dec. 19, 1967

3,359,541
DATA RETRIEVAL SYSTEM HAVING PLURAL ADDRESSED REMOTE REQUEST STATIONS
Stanley H. Hunkins, Cherry Hill, N.J., Peter W. Beresin, Philadelphia, Pa., and Robert S. Sinn, Seaside Park, N.J., assignors to Ultronic Systems Corporation, a corporation of Delaware
Filed Dec. 30, 1963, Ser. No. 334,098
6 Claims. (Cl. 340—152)

ABSTRACT OF THE DISCLOSURE

A data retriever for obtaining reply data from a memory in response to requests is connected via a pair of request and reply communication channels to a plurality of remote data terminus units. Each data terminus serves a plurality of request units in sequence, transmitting a request and receiving a reply before the next is enabled. A reply from the data retriever to a request from a given data terminus includes an address for the next data terminus which thereupon serves a request unit connected thereto. All replies from the data retriever go to all data terminus units, but only the data terminus sending a particular request supplies the corresponding reply to a request unit. Recognition of an address both enables transmission of a request and sets a sequence control circuit for enabling the next request unit after receipt of a reply.

Description of the invention

This invention relates to data storage and retrieval systems and particularly to a system for retrieving information about stock market transactions from a data storage system and supplying the information to a large number of information requesting units.

In the copending patent application of Hernan and Hunkins, Ser. No. 149,913, filed Nov. 3, 1961, entitled "Data Retrieval and Coupling System," now Patent No. 3,281,788, a data storage and retrieval system is described in which digital stock transaction information is stored on a magnetic drum. This system supplies updated stock market information to stockbrokers in their offices by means of individual consoles associated with the equipment. The stockbrokers indicate the information that they desire by actuating switches on the consoles. A plurality of such consoles are connected via a data terminus unit and a communication system to a data retriever unit and thence via a slave output control to the data storage. The requested information is obtained from the storage by the slave output and transmitted back via the data retriever unit to the data terminus unit and to the requesting consoles.

In this manner, a large number of consoles may be serviced to supply them with information from the data storage unit. A plurality of the data retriever-data terminus communication controls are serviced by a single slave output, and a plurality of such slave output arrangements are provided for each storage whereby pluralities of consoles in different remote locations may be serviced by the same data storage unit. With this system, the information desired by an operator of any one console is made available to the console almost immediately upon selection of the desired stock and category of information. Thereby, a large number of console operators may be supplied with information from the central storage system very quickly and from remote locations, and the information may vary depending upon the desires of the operator.

In the foregoing and other data communication systems, the communication channels are relatively expensive; therefore, it is desirable to provide as full utilization of the communication channels as possible. The high expense makes it difficult to serve economically small numbers of stockbrokers at remote locations.

It is an object of this invention to provide a new and improved data retrieval and communication system.

Another object is to provide a new and improved data retrieval system for supplying current information about stock transactions.

Another object is to provide a new and improved data retrieval system in which a large number of brokers may be serviced with updated stock transaction information with an economy of control and communication equipment.

In accordance with an embodiment of this invention, a single data retriever in the system of the type described above is arranged to service a plurality of data terminus units in a certain sequence by way of a single communication channel. Thereby, a substantial saving in communication equipment is attained.

The foregoing and other objects of this invention, the features thereof, as well as the invention itself, may be more fully understood from the following description when read together with the accompanying drawing, in which.

Corresponding parts are referenced throughout the drawing by similar numerals and consistent with the reference numerals employed in the copending application, Ser. No. 149,913, the disclosure of which is hereby incorporated herein.

General System

Figures 1, 2:
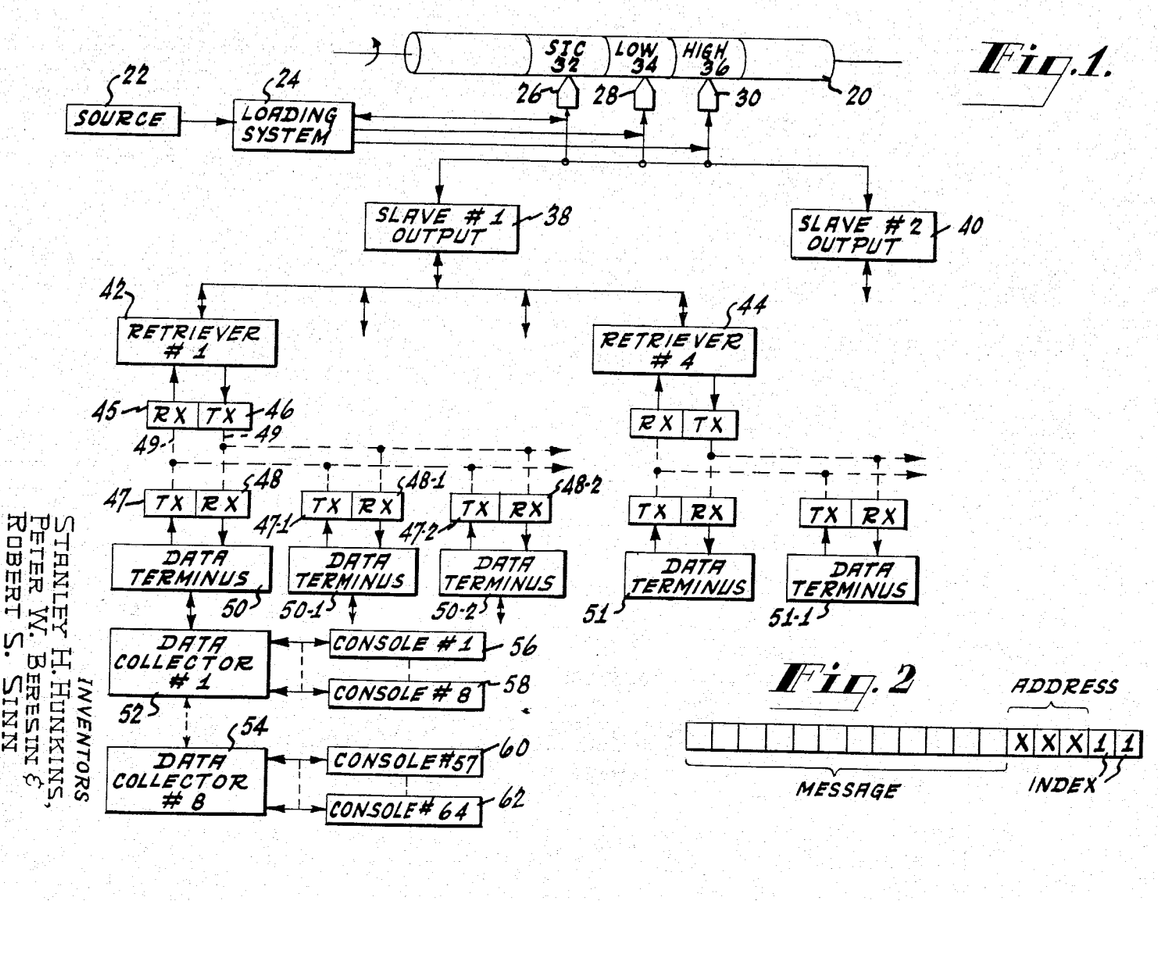
FIG. 1 is a schematic block diagram of an information storage and retrieval system embodying this invention.
FIG. 2 is a schematic diagram of the reply message incorporating information and control signals used in connection with the system of FIG. 1 and FIGS. 3 and 4.

In FIG. 1 a storage drum memory 20 receives information from a source 22 via a loading system and control 24 and read-write recording heads and amplifiers 26, 28, and 30 respectively associated with storage bins 32, 34, 36 on the recording drum 20, which bins 32, 34, and 36 store information related to the stock identification code (SIC) and associated High and Low stock transaction prices. Other bins on the drum 20 may be used to store associated information such as Last price, Closing price, Volume of sales, Number of transactions, Time of transaction, Stock earnings, and Bid and Ask prices.

The source 22 of the information may contain a master unit including a magnetic drum, similar to the drum 20, which is kept in updated condition. The master unit of the source 22 is used to maintain updated the slave memory drum 20 and any other slave memories (not shown) by means of a loading system 24. A suitable loading system of this sort is described in the copending application of Sinn, "Information Storage System," Ser. No. 108,120, filed May 5, 1961, now Patent No. 3,286,235.

Connected to the read-write recording heads and amplifiers 26, 28, and 30 are a plurality of similar slave output units 38 and 40; additional such output units may be provided. The first slave output 38 is connected to four retriever units 42, 44 which, in turn, are connected to respective receiver-transmitter communication units 45, 46. The receiver (Rx) 45 and transmitter (Tx) 46 are respectively connected via separate communication channels 49 to a transmitter and receiver, Tx 47 and Rx 48 which, in turn, are connected to a data terminus unit 50. The data terminus unit 50, in turn, is connected to a series of data collector units 52 and 54, eight of which are shown connected in series. Connected to each data collector 52 and 54 (in the illustrated form of the invention) are up to eight console units (request units) 56, 58 and 60, 62; #1 to #8 consoles 56, 58 are connected to DC-1, and #57 to #64 consoles 60 and 62 are connected to DC-8. This invention is not limited to any particular number of slave output, retriever, terminus, collector, or console units in the system; and a lesser or greater number may be incorporated to meet various requirements.

Signal transmission through this system is generally by way of binary signals in the form of high and low voltage levels respectively representing the binary digits "0" and "1" or vice versa. The communication system 45-48 may be of any suitable type employing such signals or any other appropriate form of signals and especially adapted for long distance transmission; an appropriate form of this system which is commercially available is a dataphone communication system for transmitting digital information via a voice-grade telephone line, such as channel 49, using a frequency modulation system. For example, signals of two different frequencies are generated and transmitted in response to the different voltage levels which represent the binary digits "0" and "1." The Tx units 46, 47 convert the digital voltage levels from the retriever 42 and data terminus 50 to signals of the two different frequencies, and the Rx units 45, 48 reconvert the transmitted signals back to the appropriate voltage levels.

Also connected to the communication channels 49 are a plurality of additional data terminus units 50-1 and 50-2 by means of individual transmitter-receiver units 47-1, 48-1, and 47-2, 48-2, respectively. One of the two channels 49 is used for transmission from the retriever 42 in multiple to the data terminus units 50, 50-1, and 50-2 via Tx 46 and Rx 48, 48-1 and 48-2 respectively. The other communication channel 49 is used for transmission from the data terminus units in multiple to the retriever via Tx 47, 47-1, and 47-2, respectively, and Rx 45. For the system described in detail with respect to FIGS. 3 and 4, eight such data terminus units 50 are connected on a multi-point basis to the communication channel 49; however, any desired number of such units may be connected as desired and as is practical.

To each data terminus unit 50-1 and 50-2, a plurality of data collectors (similar to the data collectors 52 and 54) are connected; and to each data collector a plurality of consoles 56, 58, 60, 62 are connected, all in a manner similar to that described above. Thus, all of the types of equipment associated with the data terminus unit 50 are duplicated in varying numbers as desired for each of the other data terminus units 50-1 and 50-2 to increase substantially the number of stockbroker consoles that can be serviced by the retriever 42 as well as to increase the variety of installations that can be serviced economically.

Each of the other retriever units represented by the unit 44 is similarly connected via transmitter and receiver units to separate pluralities of data terminus units 51, 51-1 and, via data collectors, to pluralities of console units in a similar fashion. Thus, each of the data terminus units 51 and 51-1 services a plurality of data collectors and pluralities of consoles in a manner similar to data terminus 50; and each retriever 44 services a plurality of data terminus units and associated equipment in a manner similar to retriever 42. For simplicity of illustration, additional data collectors and consoles connected in the same fashion as shown in FIG. 1 are omitted therefrom.

In operation, the console units 56-62 are successively connected via the data collectors 52, 54 to the data terminus 50 to supply a request message for stock transaction information relevant to a certain stock. Each console unit supplies a stock identifier signal code SIC and also identifies the particular category of transaction information desired, all as selected by the operator stockbroker. The signal message representing this request is transmitted via the data terminus 50, Tx 47 and channel 49 to Rx 45 and to the #1 retriever 42. The latter 42, in turn, transmits the request information to the slave output 38, which obtains access to an appropriate part of the drum 20 in which the SIC and requested information category are stored. This information is obtained by the slave output 38, formed into a reply message by retriever 42, and transmitted back via Tx 46, the other channel 49, and Rx 48 to the data terminus 50. The latter 50, in turn, supplies the reply message information via one or more of the data collectors 52, 54 to the requesting console where it is visually displayed for the stockbroker.

After the first console 56, by way of example, has sent its request and received the corresponding reply, the #1 data collector 52 enables the second console to send its request as a request message and returns the reply information to it; and so on. Successive consoles are successively enabled by data collector 52 until the #8 console 58 supplies its request and receives its reply. At that time the #2 data collector enables its first console in a similar fashion to send a request message and receive the reply. The #2 data collector goes through a complete cycle for all of its consoles, at which time the #3 data collector is activated, and so on. Thus, successively, the data collectors are placed in active condition to service successively the consoles associated with each data collector until the #8, or last, data collector 54 runs through its cycle of service for consoles 60 and 62, at which time data collector #1 is again activated to repeat the cycle for consoles 56 and 58. The complete cycle of servicing for all of the consoles 56-62 is then repeated. Since the time for transmission of request and reply messages and the obtaining of the desired information from the drum 20 is of the order of tens of milliseconds, a large number of consoles may be serviced successively in any extremely short period of time. Thereby, the requests of any one console may be filled essentially without interference by any other console connected to the same data terminus 50.

In a similar fashion, a console connected to a data collector of either data terminus 50-1 or 50-2 supplies a request message that is transmitted via the associated transmitter Tx 47-1 or -2, the associated transmission channel 49, receiver 45 to retriever 42. The latter obtains the requested information via slave output 38, forms a reply message that is transmitted back via transmitter 46, the other channel 49, the associated receiver 48-1 or -2, and the sending data terminus 50-1 or -2, and back via the data collector to the requesting console. The consoles associated with each terminus 50-1 or -2 run through their respective cycles independently of those of another terminus, except as the terminus units themselves are activated in sequence.

After the first data terminus 50 has sent a requesting message to retriever 42, the reply incorporates the requested information and also contains a portion designating an address or code indentification (as shown in FIG. 2) of the second data terminus 50-1. The second data terminus then sends its next request message at the same time that the previous reply is being processed by the first data terminus 50 and its associated data collectors and console. In a similar fashion, the second reply message incorporates the requested information for the second data terminus 50-1 as well as an address or identification of the third data terminus 50-2. Thereafter, the third data terminus 50-2 sends its next request message at the same time the second data terminus 50-1 and associated data collectors are processing the second reply message. This process is repeated successively until the last data terminus receives its reply message which incorporates the address for the first data terminus 50. The latter then sends its request message originating from the next console in turn, and the above described cycle of operation of successive data terminus units is repeated.

The operation of each retriever 44 and the terminus units 51 and 51–1 with their associated data collectors and pluralities of consoles is the same as that described above for retriever 42 and terminus units 50, 50–1 and –2.

The #1 slave output 38, after obtaining the information for a request message in #1 retriever 42, goes on to perform the same operation for #2 retriever, and then #3 retriever, and finally #4 retriever 44. The cycle is then repeated starting with #1 retriever 42, and so on. The time required for obtaining the requested information for a drum 20 is extremely short so that there is relatively a small processing time added to the request-reply operation due to one retriever sharing the slave output 38 with one or more others. Accordingly, all of the consoles connected to the terminus units 50, 50–1, –2, 51 and 51–1, etc. are serviced on a fast and efficient basis. The consoles connected to any one data terminus are successively and cyclically serviced; consoles connected to the terminus units for any one retriever are serviced on an interleaved basis; and the consoles connected to different retrievers are essentially independent of each other and effectively serviced very rapidly by the same slave output 38.

The second slave output 40 is connected to the drum storage 20 via the same read-write heads and amplifiers 26–30 (or by separate ones, if desired), and it services similar retriever, communication, data terminus, and data collector units to pluralities of consoles, and the operation is similar to that described above. One or more additional slave outputs 40 may be provided in this manner, and the operation of each is independent of the operation of any other coupled to the same drum 20, so that the consoles associated with each slave output are serviced simultaneously and independently.

*System logic and circuits*

The system logic described hereinafter is based on NOR logic units (though this invention is not restricted in its application to any particular type of logic or circuitry). Suitable forms of circuits for each of the blocks are described in the copending application, Ser. No. 149,913. Also described in that patent application are suitable constructions of console units, data collector units, and slave output units that may be used with the system of FIG. 1. The data terminus and retriever units described hereinafter are intended for operation with these other units of the aforementioned patent application. Corresponding units used in the system may have the same construction for ease of manufacture. However, small variations may exist in the construction of the retriever units in order that they can accommodate different numbers of data terminus units; and differences are provided in the data terminus units so that each one associated with a particular retriever is identified by a different address.

*Data terminus*

Figure 3:
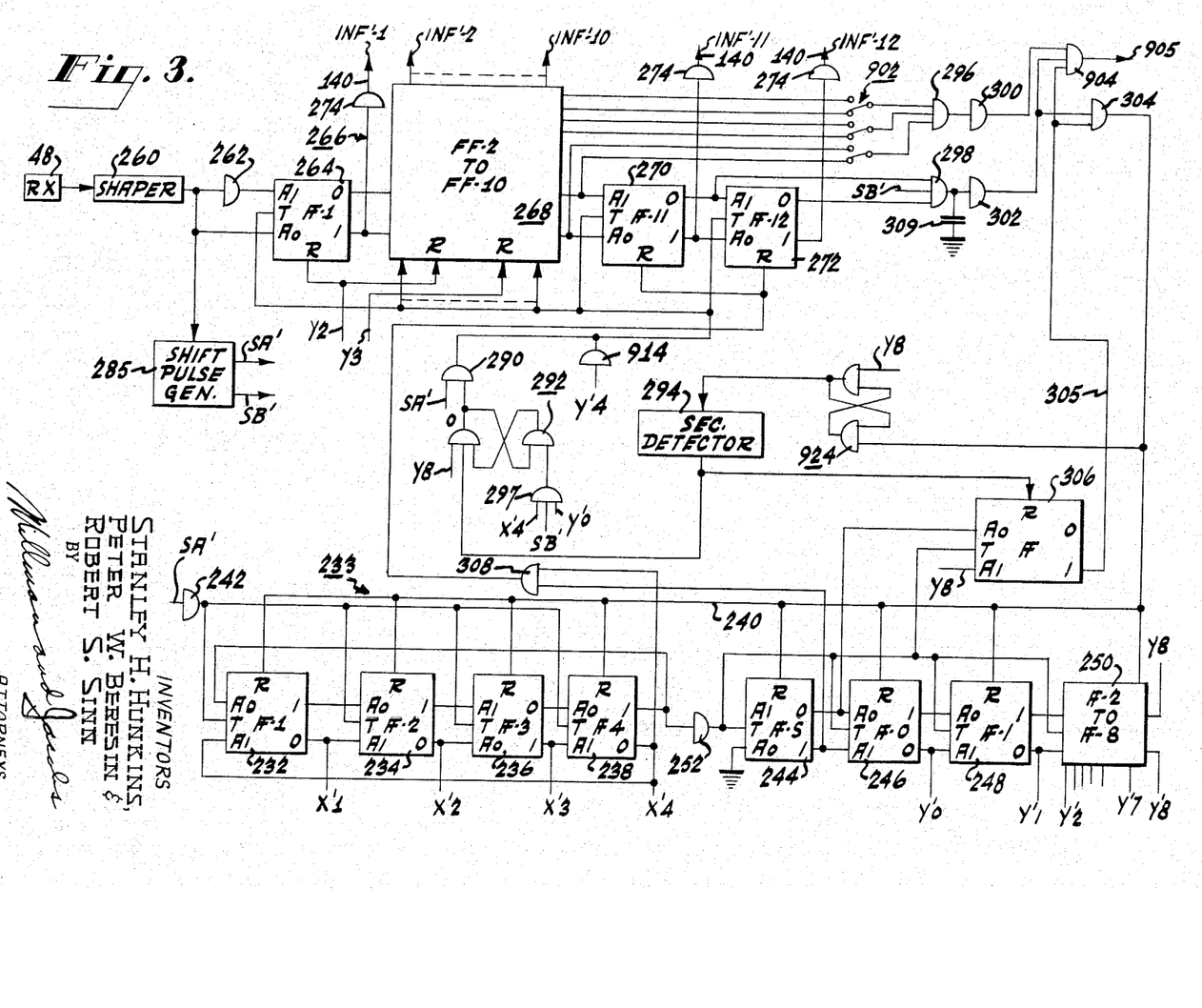
FIG. 3 is a schematic block and logic diagram of a portion of a data terminus unit embodying this invention that is used in the system of FIG. 1.
Figure 3A:
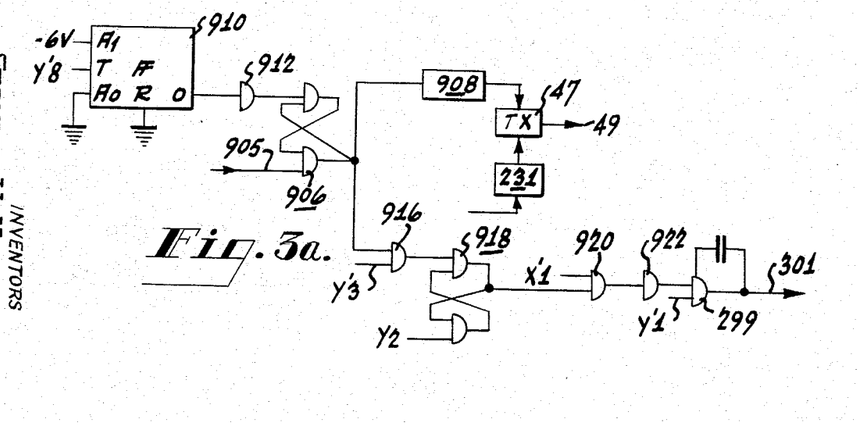
FIG. 3a is a schematic block and logic diagram of a portion of the data terminus unit and a continuation of the diagram of FIG. 3.

In FIG. 3A of Ser. No. 149,913, there is described the portion of the data terminus 50 which receives the request message lines from the data collector 52. This portion of the data terminus receives all of the bit signals forming the request message in parallel and functions to send these signals together with two index-1 bits as a serial message to the transmitter unit 47 under the control of timing signals described hereinafter in connection with FIG. 3. These message signals in series are sent to Tx 47 via a level changer circuit 231 (FIG. 3a herein), and Tx 47 transmits the message on channel 49 when it receives a control signal that enables the generation of a carrier signal.

In the logic described hereinafter the binary signals are generally in the form of voltage levels. A high (ground) level may be considered to be representing "1," and a low (negative) level as representing "0"; these signals are also used generally to represent, respectively, a command and the inverse form of a command. The inverse form of a signal identifier is represented by the addition of a prime (') thereafter. Any inverted signal that is present is a negative voltage level. Any signal is converted to its inverted form, and vice-versa by a NOR gate or an inverter.

In FIGS. 3 and 3a the remainder of the data terminus unit 50 is illustrated; and in the lower portion of FIG. 3, the sequencer 233 for developing the X' and Y' timing signals is illustrated (these X' and Y' signals control the aforementioned parallel to serial conversion operation of the data terminus). This sequencer includes a 4-stage X-shift register made up of four flip-flops 232–238 connected in cascade with 1- and 0-outputs of the first FF–232 respectively connected to the 0- and 1-inputs of the second FF–234; the 1- and 0-outputs of the second FF–234 respectively connected to the 1- and 0-inputs of the third FF–236 (the third FF–236 being connected in a relatively "inverted" form); the 0- and 1-outputs of the third FF–236 being connected to the 0- and 1-inputs of the fourth FF–238; and the 1- and 0-outputs of the fourth FF–238 being connected to the 0- and 1-inputs of the first FF–232 for recirculation. These flip-flops 232–238 are reset at the same time via line 240. Shift pulses are supplied in the form of SA' signals via inverter 242 to the T-inputs of the shift register flip-flops.

In operation, the shift register flip-flops 232–238 are initially reset by a high signal on the line 240. When so reset, the line X'–3 is a low signal (being taken from the 1-output of FF–236), and lines X'–1, X'–2, and X'–4 are all high. When the next shift pulse SA is applied to the T-inputs, the 1-state is shifted to FF–238 so that line X'–4 is low, and the other outputs are all high. The succeeding shift pulse SA causes the 1-state to be recirculated so that the low output is transferred to line X'–1; the third SA shifts the low output to line X'–2; and the fourth SA shifts the low output to line X'–3, and so on cyclically.

The other part of the sequencer includes the shift register of flip-flop stages 244, 246, 248 (respectively represented as FF–S, FF–0, FF–1), and of seven similar stages in a block 250 (representing FF–2 to –8). FF–S is connected in an "inverted" configuration (similar to flip-flop 236 described above), and has its 0- and 1-outputs respectively connected to the 0- and 1-inputs of FF–246. The 1- and 0-outputs of FF–246 are connected to the 0- and 1-inputs of FF–248, and so on with flip-flops 248–250 connected in the latter fashion. The Y'–0 to Y'–8 outputs are taken from the 0-outputs to FF–0 to –8. FF–244 to –250 are also reset from the line 240. The T-inputs of all of these flip-flops receive signals via inverter 252 from the 1-output of flip-flop 238. The 0-input of flip-flop 244 is connected to ground, and the 1-input thereof is left unconnected; thereby, FF–244 always is in the set condition except for the short period following its reset via line 240.

In operation, the reset signal initially resets all of flip-flops 244–250. Thereafter, upon recirculation in the X-register, FF–238 is first set to the 1-state and then reset to the 0-state, and upon reset its 1-output changes from a ground voltage to a low voltage which is inverted by inverter 252 to supply a ground trigger voltage to FF–244 to –250. FF–246 is set to the 1-state due to the ground and low voltages then appearing on its 0- and 1-inputs, respectively (from reset FF–244); and flip-flop 244 is also set to the 1-state due to ground on its 0-input. Upon completion of the next complete cycle of the X flip-flops 232–238, another trigger pulse is passed via inverter 252 to shift the 1-state from FF–246 to FF–248. This process is repeated for each cycle in the X flip-flops, and, for nine such full cycles, the 1-state is successively transferred from FF–246 through the last flip-flop of block 250. The initial two steps in FF–236 and –238 are used to start the sequence by transferring the 1-state into FF–246, which 1-state is effectively established by the inverted position of reset FF–244. In other words, two SA pulse times after reset of all the sequencer flip-flops 232–238 and 244–250, FF–246 is set to the 1-state to develop the Y'–0 signal. After the next four SA pulses, the X flip-flop cycle is again completed to develop Y'–1, and so on. When Y'–1 is developed, the gating operation of the next request message is initiated as described in Ser. No. 149,913. After the nine cycles, the Y'–0 to –8 signals are not generated until FF–244 is again reset via line 240.

In the upper part of FIG. 3 the portion of the data terminus that is effective to receive and process the reply message from Rx 48 is illustrated. The signals from Rx 48 come in at a 1 kilocycle rate and are supplied to a shaper 260 which is an appropriate form of amplifier and signal-forming and level-setting circuit to adapt the signals from Rx 48 to the form needed for the circuitry of the data terminus. The output signals of the shaper 260 are a high voltage level representing "1" and a low voltage level representing "0."

These voltage levels are supplied directly (and via an inverter 262) to the 0-input (and the 1-input) of the first flip-flop 264 of a 12-bit reply message shift register 266. FF–2 to –10 of shift register 266 are illustrated simply by a block 268; FF–11 and –12 thereof are represented by the blocks 270 and 272. The flip-flops of the shift register 266 are connected in the manner described above, and the stages are generally the same except for features hereinafter noted. The inforamtion outputs from the shift register 266 are taken in parallel from the 1-outputs of the individual flip-flop stages and fed via inverters 274 to the lines INF'–1 to –12, respectively, which are the reply message input lines 140 to the data collector.

The information pulse from the shaper 260 is also supplied to a synchronizing shift pulse generator 285 (described in copending application Ser. No. 149,913). The latter produces narrow shift pulses SA' at the same rate as the information being transmitted and occurring in the middle of an information bit. These shift pulses are passed by gate 290 to trigger the flip-flops of the reply message register 266 and thereby sample the incoming information. These pulses SA' are also used to trigger the sequencer 233. The SB' pulses are generated at the same rate, but they occur at the trailing edge of each information bit.

The gate 290 is enabled by the 0-output of of FF–292 (shown as formed by two NOR circuits connected in a regenerative configuration). The set input to the flip-flop 292 is the Y–8 signal which is available from the last stage of the sequencer 233 during the last portion of the transmission of the request message. Another set input to FF–292 is a normally low signal from a half second detector circuit 294 which is described below. Any reply information left in the register 266 is effectively cleared during the transmission of the request message; that is, Y–2 clears FF–1 to –5, and Y–3 clears FF–6 to –10, and FF–11 and –12 are cleared by the first shift pulses SA supplied thereto.

The reply message that is transmitted is in the form of a 17-bit message (shown schematically in FIG. 2); the first five bits of which form a synchronizing section and the last twelve bits of which are information bits. The first two bits of the synchronizing section are index 1-bits common to all replies, and the next three bits are a combinatorially coded address that identifies one out of eight possible terminus units connected to the particular retriever unit. When the first two index bits are established in FF–11 and FF–12, this condition is recognized by gate 298 that receives the outputs of those flip-flops together with the SB' pulse. The output of gate 298 (stretched by shunt capacitor 309) is supplied to gate 304 via inverter 302 together with the enabling output from a flip-flop 306. Gate 304 supplies a reset pulse to the line 240 to reset the sequencer 233 and initiate the cycle of that sequencer in the manner described above. Thereby, the particular data terminus unit cycles through its normal reply message process even though the particular reply message that initiated the action may not contain the individual address code associated with that terminus. As a consequence, the particular data terminus, even though it is not addressed, is operating through a cycle and is not in a condition to be triggered into action again by the fortuitous occurrence of a particular message portion in the last five stages of the register 266 that are precisely the index bits plus the associated address bits. Accordingly, even if the exact binary combination should exist in those stages of the register 266 at a subsequent time, the data terminus is already in operation and will not be affected.

The detection of the correct address is performed with the 0- and 1-outputs of FF–8, –9, and –10 of register 266. These pairs of outputs are respectively connected to corresponding input terminals of a terminal box 902 in which the input terminals are in pairs, and an output terminal is associated with each pair. A jumper is manually and individually set between each output terminal and one of the associated input terminals to establish the proper address combination corresponding to the individual data terminus unit. Thus, each terminus of any one retriever is set to a different address. The output terminals of box 902 are connected to a gate 296 which is enabled when the proper address is established in FF–8 to –10 and which produces an output that is supplied via inverter 300 to enable a gate 904. The latter 904 also receives the signal from inverter 302 that indicates the receipt of the proper index-1 signals, as well as the enabling signal on line 305 from FF–306.

Thus, when the proper 3-bit address code is present in FF–8 to –10 and the proper index-1 bits exist in FF–11 and –12, the combination enables gate 904 to set a transmit-control flip-flop 906 (FIG. 3a), the 0-output of which is supplied to a level changer circuit 908. The output of the latter 908 is supplied to the control input of Tx 47 associated with the data terminus 50. This control input determines whether or not the dataphone transmitter produces a carrier on its output line.

When the flip-flop 906 is reset, the generation of the carrier signal is inhibited; and when it is set, the level changer 908 amplifies the signal to the Tx unit to enable it to generate the carrier, which, in turn, is modulated by the request message signals coming from another level changer 231 of terminus 50. Accordingly, only when the proper address bits are established in FF–8 to –10 together with the index bits in FF–11 and –12, is Tx 47 enabled to transmit the request message that is supplied to it. Otherwise, signals supplied by the level changer 231 are not transmitted out to the communication channel. Thus, the data terminus unit is always actuated by the index-1 bits to start its request message cycle; but if the preceding reply message did not contain the corresponding associated address, there is no transmission of the request message supplied to Tx 47. Upon the completion of the request message cycle in the data terminus, the Y'–8 pulse applied to the T-input of pulse former 910 is passed by an inverter 912 to reset transmit-control flip-flop 906 and thereby inhibit the generation of the carrier signal so that the communication channel is free for the next data terminus to send its message.

Returning to FIG. 3, at the same time as the cycle of sequencer 233 is started, the last five bits of the reply message continue to be supplied via Rx 48 and shaper 260 to the reply message shift register 266. These next five information bits are effectively counted in the sequencer 233; that is, the receipt of the first of these last five bits in FF-264 is synchronized with a first SA', which is counted by the 1-state being shifted into FF-238 of the sequencer. The next four bits are counted by a complete cycle of the X flip-flops and FF-238 is again in the 1-state when the fifth bit has been established in the shift register 266. The count of the last five information bits is indicated by X'-4 and Y'-0, which signals are supplied to gate 297 together with SB' to reset FF-292, which, in turn, closes gate 290 to prevent further shift pulses being supplied to the reply message shift register 266.

After the two index and three address bits in FF-8 to -12 are recognized and the sequencer flip-flops are reset, the first SA' establishes X'-4 which is applied to a gate 308 together with the 1-output of FF-244. The output of gate 308 is used to reset FF-11 and -12 of reply message shift register 266 (capacitor 309 connected in shunt between gates 298 and 302 stretches the pulse from FF-11 and -12 and ensures a full reset action notwithstanding the resetting of the latter). This reset condition of FF-11 and -12 prevents a second, spurious recognition of the index or address bits as the reply message (the first information bit thereof) is shifted into FF-8. This spurious recognition might otherwise arise by a fortuitous combination of bits in the last five register stages. Reset inputs of FF-11 and -12 also receive Y'-4 via inverter 914.

The half second detector 294 is a circuit which is driven by the voltage step appearing at the 1-output of FF-924 when the latter is set, e.g. by Y-8 upon completion of the transmission of the request message. If FF-924 is not set again in that half second period by another Y-8, the detector 294 supplies a positive pulse to set FF-292 and to reset FF-306. The latter enables gate 304 for passing a reset signal to line 240 that also resets FF924. A special reply message is generated by the retriever unit under the conditions indicated so that the two index bits thereof are established in FF-11 and -12 to generate the reset signal that is supplied via enabled gate 304 to reset the squencer 233. Thereby, the sequencer cycle is initiated so that the next Advance pulse is generated (by gate 299, as explained below), and the next console request can be serviced.

The half second detector 294 is effective to correct any momentary stalling of the control cycle, for example, due to FF-292 or -306 being in the wrong state when the power is turned on, or due to a reply message not being received to reset the sequencer 233.

A suitable circuit for detector 294 may include a transistor that is normally biased on to provide the desired positive output signal and that is biased off by the voltage across a charged capacitor that is coupled to the output of FF-924. The capacitor is charged by the setting of FF-924 and has a half-second discharge time constant to a voltage at which the transistor is biased on.

Flip-flop 306 set is by the 0-output of FF-S (which condition occurs when the reset pulse is supplied via line 240) and by the trigger pulse output of inverter 252, which occurs on the second SA' after FF-306 is set. When reset, gate 304 is closed (as in gate 904), and detection of the 2-bit index is blocked effectively (as is the 3-bit address). The Y-8 signal is used to reset FF-306 to enable the gate 304 when the end of the request transmission is essentially completed. Thus, FF-306 opens gate 304 only for the first index detection so that if an improper reply message is received, the sequencer 233 is not reset.

When transmit-control flip-flop 906 is set to enable the transmission of the request message, a gate 916 is enabled to pass the next Y'-3 pulse to set Advance-control flip-flop 918 (which is reset by the Y-2 pulse of the following sequence cycle). The output of set flip-flop 918 enables a gate 920 to pass the X'-1 pulse via inverter 922 to gate 299. This pulse is passed by gate 299 when it is enabled by Y'-1 of that following sequence cycle to generate an Advance pulse on line 301. The Advance pulse is effective to initiate acceptance of the twelve information signals INF'-1 to -12 of the reply message (established on lines 140 of reply register 266) by the proper data collector. This Advance pulse from gate 299 is also effective to step the data collector commutator in order to enable the next console to supply its request message, which is immediately supplied to the request portion of the data terminus. Thereby, the next console's request is immediately available to be sent to the data retriever when the data terminus next receives its address in a reply message.

During the reply messages that do not contain the address code, control-transmit FF-906 remains reset as does Advance-control FF-918 to inhibit gate 299 and to inhibit the generation of an Advance pulse on the line 301. Once it is set, FF-918 remains so even though FF-906 is reset at the end of the request message cycle. On the next reply message cycle, the Advance pulse is generated, and it is during this succeeding reply message that the true answer for the request (transmitted one cycle earlier) is established in the register 266. FF-918 is reset after the Advance pulse is generated and remains reset until the next true request is actually transmitted.

Thus, the reply portion of the data terminus is effective to receive the reply information as a serial message from the retriever and to establish it in parallel form. If the reply is in response to its own request, the terminus unit generates an Advance signal that is supplied to the data collectors. Thereby, the data collectors are actuated to accept the information for the requesting console and to enable the next console to send its request. If the reply is not in response to its own request, the terminus unit goes through an operating cycle but does not generate an Advance pulse; and if the reply incorporates the address of the terminus, it transmits a new request message.

*Retriever*

Figure 4:
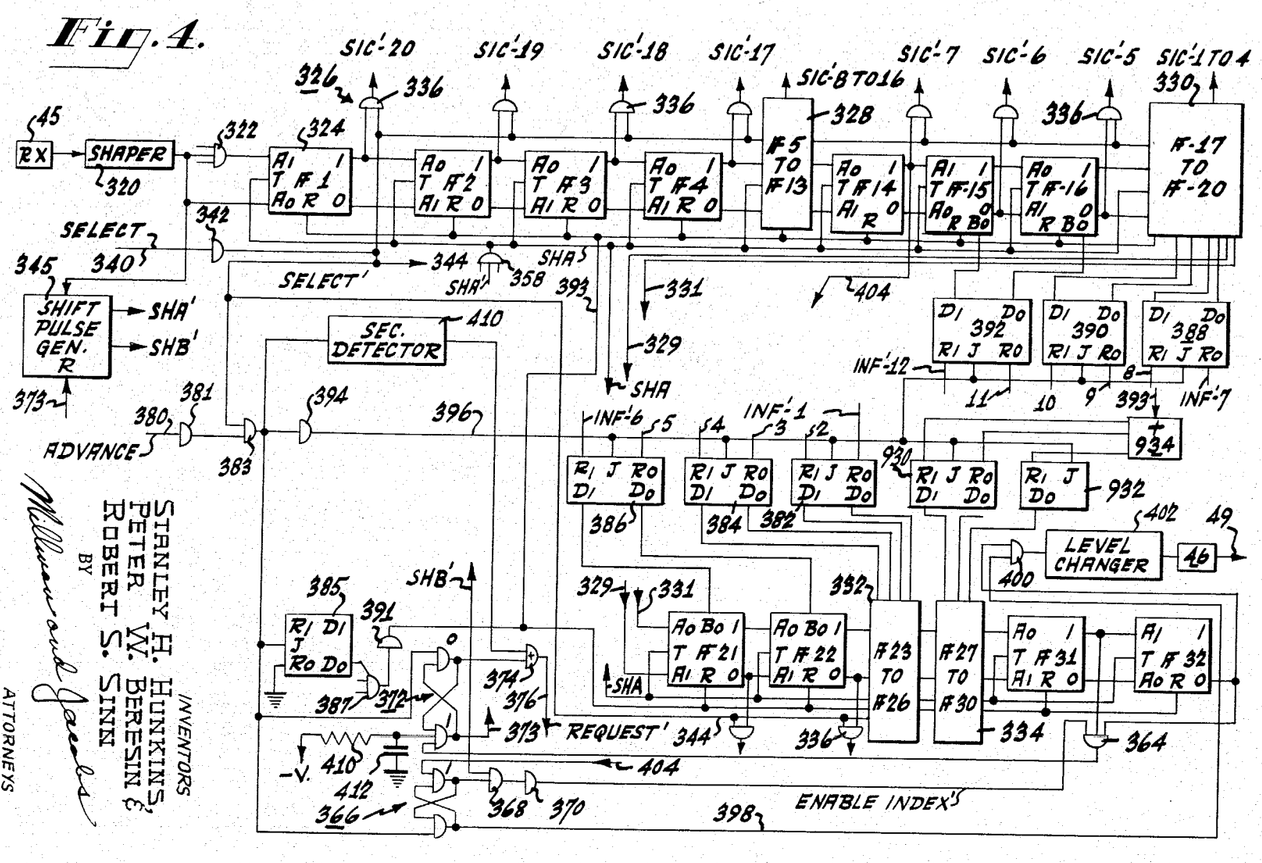
FIG. 4 is a schematic block and logic diagram of a data retriever unit that embodies this invention and is used in the system of FIG. 1.

In the retriever 42, illustrated in FIG. 4, the request message signals received from the request portion of the data terminus via Rx 45 are supplied to a shaper circuit 320 which sets the proper levels and forms the pulses received fro the dataphone. The signal output of the shaper 320 is in the form of a groud level for binary 1 and a low voltage for binary 0.

These signals are supplied directly and via an inverter 322 to the 0- and 1-inputs of a first flip-flop 324 in a 32-stage message shift register 326. Generally speaking, the thirty-two stages of the shift register 326 are connected in a manner similar to those described above with the 1- and 0-outputs of one connected to the 0- and 1-inputs of the next, except for FF-15 and -32 which have their inputs inverted. FF-5 to FF-13 are represented by a block 328, FF-17 to FF-20 are represented by block 330, FF-23 to FF-26, by a block 332, and FF-27 to FF-30, by a block 334. In each of these blocks the flip-flop stages are connected in the same way as the stages immediately precedent thereto, except as hereinafter noted.

Outputs from FF-1 to FF-30 are taken in parallel via gates individually associated with these flip-flops. It will be apparent that the outputs from FF-1 to FF-20, respectively, represent the bits SIC'-20 to SIC'-1, and the outputs from FF-21 to FF-30, respectively, represent the selector bits E-H in a manner consistent with the operation of the gates in the request portion of the data terminus. The outputs of FF-1 to FF-14 are derived from the 1-outputs thereof; the outputs of FF-15 to FF-30 are derived from the 0-outputs thereof, due to the inverting relationship of the inputs of FF-15 and the outputs.

The message signals from the shaper 320 are also supplied to a shift pulse generator 345 (described in detail in Ser. No. 149,913), which generates shift pulses SHA' and control pulses SHB' in a similar time relation as described above for SA' and SB'.

In operation, when the request message is received from Rx 45, the successive thirty-two bits thereof are established in FF–1 to FF–32 under the control of the shift pulses SHA. The first two bits of the request message are index-1 bits (as described in Ser. No. 149,913) in connection with the development of the request message in FIG. 3A thereof). When these index-1 bits are established in FF–31 and FF–32, an index detector gate 364 is enabled by the 1-output of FF–31 and the 0-output of FF–32 (FF–32 being connected in inverted form). A third input to gate 364 is an Enable-Index' signal, which is developed from the 1-output of a reset output flip-flop 366 (gated with SHB' in gate 368 and inverted by inverter 370).

The output of gate 364 is used to reset a shift flip-flop 372, the 0-output of which is supplied via inverter 374 to a Request' line 376 to the slave output 38. The Request' signal on line 376 asks the slave output for access to the slave drum 20, and when the slave output 38 is available, the Select signal is supplied therefrom on line 340. This Select signal is effective, via inverter 342 and line 344, to open the gates 336 and read out the contents of the message shift register 326 in parallel. The Select and Request' signals continue thereafter for the time that is required by the slave output to process the request and obtain the requested information, and effectively maintain a coupling between retriever 42 and slave output 38.

For the duration of the Select signal, no further shift pulses SHA' are developed by the binary counter; that is, the 1-output of reset shift flip-flop 372 is supplied via line 373 and a reset input of shift pulse generator 345 to maintain the latter in a reset condition. Accordingly, any signals that may be supplied from Rx 45 during the time that the Select signal is on are not shifted into FF–1 and do not affect the contents of the message shift register 326.

When the requested information has been obtained by the slave output, it supplies an Advance-signal on line 380 and, at about the same time, supplies the twelve information bits to the inputs of six jam gates 382–392; gate 382 receives INF'–1 and –2 at its respective two inputs, and so on, with gate 392 receiving INF–11 and INF–12 at its respective two inputs. The 1- and 0-outputs of jam gate 392 are respectively connected to the B–0 inputs of FF–15 and –16, and so on, with the 1- and 0-outputs of gate 382 being applied to the B–0 inputs of FF–25 and –26.

When the Advance pulse is received on line 380, it is supplied via inverter 381 to gate 383, which is enabled by still present Select'. The output of gate 383 is applied to a jam gate 385, the 0-input of which is grounded, and the 0-output of which is applied to the base input of inverter 387 which, via inverter 391, supplies a reset signal to line 393. Thus, the Advance signal on line 380 is differentiated in gate 385 to supply a high reset signal on line 393 which is connected to the R-inputs of all the stages of message register 326 so that the Advance pulse is effective at its leading edge to reset the shift register 326.

In addition, the Advance pulse is inverted by inverter 394 and supplied to the J-inputs of the jam gates 382–392. Thus, when the Advance pulse terminates, Advance' on line 396 goes positive to jam the information signals on the inputs of the gates 382–392 into FF–26 to –15. Accordingly, the requested information is established in a portion of the message register 326 and ready for transmission back to the data terminus 50.

A three-stage binary counter 934 is provided which is triggered via line 393 by the leading edge of the Advance pulse. These three stages of the counter 934 develop eight binary address combinations with successive Advance pulses, each of the latter being generated following the processing of a request message. This counter may be a continuously recycling counter to generate the eight addresses respectively established in the terminal boxes 902 of the eight terminus units 50, 50–1, 50–2, if that number is provided in the system. Alternatively, the counter 934 may be adapted to recycle to a 0-count when any predetermined count is reached corresponding to the total number of terminus units that are used for the particular retriever. That is, the counter 934 steps through the same number of counts as the number of terminus units so that the retriever unit generates a single address for each such terminus unit.

One way in which this recycling may be performed is to provide a gate that receives, via a manually settable terminal box, the combination outputs of the three stages of the counter corresponding to a count at which recycling should take place; the output of the gate, in turn, is used to reset all of the binary counter stages via another gating circuit upon the occurrence of the trailing edge of the Advance pulse which occurs immediately after the address in the counter has been passed via gates 930 and 932 to FF–27, –28, and –29. Accordingly, each retriever unit is individually settable to supply address codes that correspond to the number of terminus units that it services.

The binary counter 934 is connected from the 0-output of its three stages to the three inputs of the jam gates 930 and 932, the outputs of which are connected to the corresponding inputs of FF–27, –28, and –29, respectively. Thus, upon the trailing edge of the Advance pulse on line 396, the address established in the three stages of the binary counter is jammed into the register flip-flops, FF–27, –28, and –29.

The gated Advance pulse, at its leading edge, also sets the output flip-flop 366, which supplies an enabling output signal via line 398 to output gate 400, the output of which is applied via a level-changing circuit 402 to Tx 46. When the output gate 400 is initially enabled, the 0-output of reset FF–32 is at a high voltage, and no change takes place at the output of gate 400.

The gated Advance pulse, at its leading edge, also sets shift flip-flop 372, whereby the disabling, resetting signal from line 373 to the shift pulse generator 345 is removed so that SHA pulses are generated. Accordingly, the next shift pulse SHA that is generated shifts the reset state of FF–31 into FF–32, where it is effectively inverted and appears on its 0-output as a low voltage signal that is passed by enabled output gate 400 as a 1-bit to the level changer 402, which supplies it to Tx 46 (the latter is continuously enabled for the generation of the carrier signal). The next shift pulse SHA is generated at the transmission rate, and the second bit (originating in FF–30) is passed by gate 400 as the second index-1 bit. Thereafter, the three address bits (originating in FF–27 to –29) are passed by gate 400 at the desired rate.

The successive shift pulses SHA thus shift the information and other bits of the reply message out of registers FF–15 to FF–31, and via gate 400 to Tx 46 for transmission back to the data terminus units. Upon completion of this transmission, the message shift register 326 is clear and ready to receive the next request message from Rx 45. When the data terminus units receive the full reply message, the sequencer 233 of the addressed one initiates the sending of another request message in the manner described above. Accordingly, the retriever is in proper condition to receive that next request message.

When the first bit (an index-1 bit) of the next message is supplied to FF–14 of message register 326, the 1-output of FF–14 connected via line 404 to the output flip-flop 366 resets that flip-flop. The latter provides Enable Index' for gate 364 to detect the arrival of the index bits of the request message in FF–31 and –32. FF–14 is used to provide the detection of the first bit of the new request message for changing the state of output flip-flop 366 because it is the last flip-flop in the register 326 which is not used for the reply message. This ensures that the index detector gate 364 remains disabled as long as convenient to prevent any noise signal which may have gotten into the shift register from initiating operation of the control logic. However, if any serious noise does result in a detection by gate 364, it may cause a momentary error in the display, but on the next request cycle within a short period of time, the display is corrected, and to the operator, it may appear only as a momentary flicker.

At the 1-input of the shift flip-flop 372, a resistor 410 and capacitor 412 are connected in series with their junction at the input to the flip-flop. This resistor-capacitor combination is effective to apply an initial high (ground) level to the flip-flop to reset it when the power is first turned on. The reset flip-flop 372 has the effect of re-setting the shift pulse generator 345 and also stimulates the sending of Request' to the slave output to initiate the operation of the system and the effective coupling of the retriever to the slave output.

When the Advance pulse from the slave output sets the flip-flop 372, the Request signal is terminated, and at about the same time, the slave output steps (as described in Ser. No. 149,913) to fill the request of the next retriever.

Another half-second detector 410 (similar to that 294 of FIG. 3) is provided in the retriever and is connected to receive the Advance pulses via gate 383 and supply a pulse to buffer inverter 374. Thereby, if an Advance pulse is not received within a half second, the detector 410 initiates the generation of Request', which signal is effective to couple the retriever to the slave output (as described in Ser. No. 149,913).

To summarize, the retriever receives a serial request message from any of its terminus units and establishes it in parallel in register 326. The index bits are detected, Request' to the slave output is generated, and Select is returned therefrom. When the slave output is ready to return the reply information, it supplies Advance to clear the register 326 and enter the information therein in parallel, and to step the address counter 934 and enter it in register 326. The information and address are then sent out as a serial reply message to the terminus units.

*Overall operation*

Figure 5:
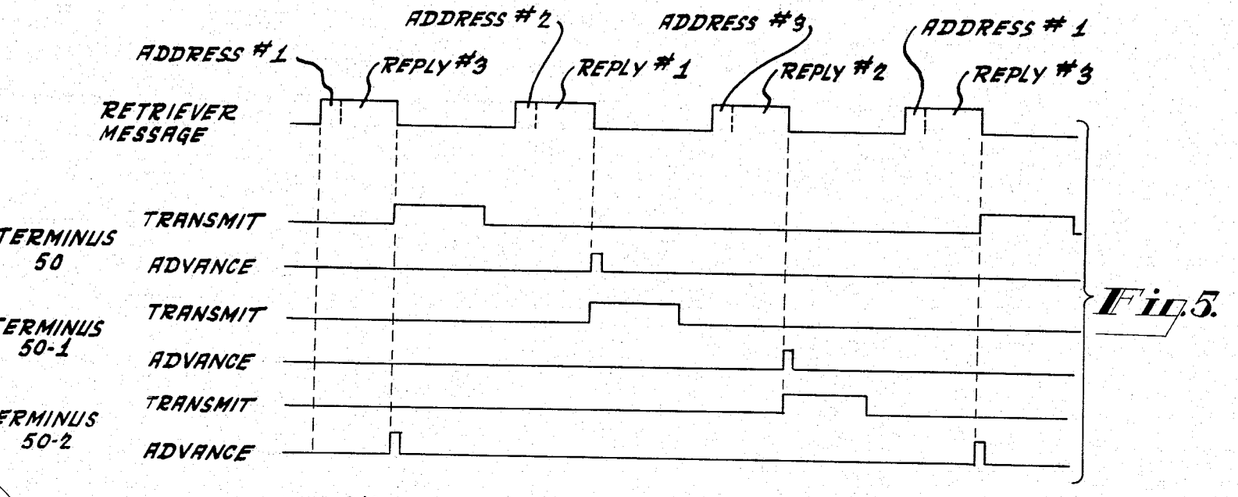
FIG. 5 is an idealized graphical diagram of the operational timing in the system of FIG. 1.

The overall operation of the system of FIG. 1 is described in connection with the apparatus associated with the slave output 38; the operation in connection with the other slave output 40 is the same to the extent that similar apparatus is connected thereto. The operation is described in connection with FIG. 5 which shows the relative timing of operations in the data terminus units 50, 50–1, 50–2.

An initial condition may be assumed, in which the last data terminus (e.g. terminus 50–2) has sent a request message to retriever 42, and the latter has sent back a reply that incorporates the address of the first data terminus 50. The last terminus unit 50–2 processes its reply message via its associated data collector to the requesting console. The first terminus unit 50, upon receiving its address corresponding to the individual setting of its own terminal box 902, is activated for transmission of the next request message, which may have been established by #1 console 56 of #1 data collector 52 associated therewith. That is, gate 296 (FIG. 3) is enabled to enable gate 904 together with the recognized index pulses that produce a pulse from 298, and the output of gate 904 sets transmit-control FF–906 (FIG. 3a) via line 905.

The output of FF–906, via level changer 908, enables the generation of the carrier signal in Tx 47. The latter thereby transmits the request message received via level changer 231 that is established serially in the other portion of the data terminus by the timing pulses from sequencer 233. The retriever 42 is actuated by this request message, and its cycle of operation is performed to send the request information to the slave output 38 and receive back the reply information on the information lines at the inputs to jam gates 382–392.

At the leading edge of the Advance pulse that is generated when the slave output has completed its operation, the register 326 is cleared via the pulse on line 393, and the binary counter 934 is stepped to an address corresponding to data terminus 50–1. On the trailing edge of the Advance pulse, the information is jammed into FF–15 to FF–26, and the three address bits are jammed into FF–27 to FF–29. The shift pulse generator 345 then reinitiates the generation of shift pulses SHA, and the #1 reply message is gated out to level changer 402 and Tx 46.

The #1 reply message received by Rx 48, 48–1 and 48–2 is sent into the reply message registers 266 of each data terminus 50, 50–1, and –2. However, the FF–906 of terminus 50 had previously set Advance-control FF–918 of that terminus (while the corresponding FF–918 of the other terminus units 50–1 and –2 remained reset). Accordingly, an Advance pulse is generated on line 301 of data terminus 50 solely, so that its data collector 52 is the only one that receives such an Advance pulse and that accepts the information established in the reply message register 266. Accordingly, this information is returned to #1 console 56, which had requested it.

This same #1 reply message also incorporated the #2 address, that for terminus 50–1. Accordingly, transmit-control FF–906 of terminus 50–1 is set when the #1 reply message is received, and Tx 47–1 is enabled to generate a carrier, and it is the only one so enabled. Accordingly, the request established in the next-in-sequence console associated with terminus 50–1 is sent out via Tx 47 and communication channel 49 to Rx 45 and to the retriever 42. The retriever obtains the reply message information from the slave output 38, and the Advance pulse is generated there to step the binary counter 934 so that the #3 address of terminus 50–2 is established therein. The #2 reply message is composed and transmitted out via Tx 46 and back via line 49 to Rx 48, 48–1 and –2 and to terminus units 50, 50–1, and –2.

This time the second data terminus 50–1 is the only one in which FF–918 is set, and it generates an Advance pulse on its corresponding line 301 so that its data collector accepts the reply information and transmits it to the requesting console. This #2 reply message sets the control transmit FF–906 only in the third data terminus 50–2 to enable its Tx 47–2 for generation of a carrier signal and the transmission via line 49 of the next request established in one of its associated consoles.

This process continues in the manner described, and if there are eight such data terminuses, upon the eighth reply message being received, the address established by the binary counter 934 of retriever 42 corresponds to the first data terminus 50 so that the cycle is started again. However, if only three terminus units are provided, the counter 934 of retriever 42 is recycled to a 0-count after the #2 reply message has been set up in the retriever register 326. That #2 reply message includes the #3 address of the third terminus 50–2; and the succeeding #3 reply message will therefore include #1 address of the first terminus 50.

Upon starting the second cycle of first data terminus 50, #2 console associated with #1 data collector 52 sends its request, and the above operation is repeated through another cycle of terminus units 50, 50–1, and –2 in the manner described. This operation then continues on indefinitely.

Each time that the slave output 38 services a request from retriever 42, it goes on to service requests from the next three retrievers up to the fourth retriever 44. Upon completion of the latter's request, slave output 38 returns to service the request from retriever 42, which then has the succeeding request supplied by one of its terminus units. The retriever 44 operates in a similar fashion with its terminus units 51, 51–1, as do the other retriever units served by the slave output 38.

The above description of this invention has a number of advantages. For example, since each retriever may be used to serve a plurality of data terminus units, there is an economy in the actual equipment required to serve the same number of ultimate consoles or stockbrokers; the economy is in terms of the number of retriever units and slave output units that are required at the slave memory station. Moreover, fewer dataphone units are required for the same number of data terminus units since but one dataphone unit is required for the retriever that serves the plurality of terminus units. Most important is the reduced total length of communication channel that is required to serve a given number of brokers or console operators, since but a single duplex channel serves a plurality of terminus units. For example a situation that may arise is one in which there are five stockbroker offices in a town a substantial distance (say, 50 miles) from a city that is served by a slave memory station. These five stockbrokers are not sufficient in number to support economically an entire slave installation within their own town, and, therefore, they require service from the existing slave station. Due to the offices being substantially separated, they would each require a separate data terminus unit. The equipment required to serve them under the system of FIG. 1 would include a single pair of telephone lines to the town, five terminus units and five associated dataphone units together with one slave output. Without this invention and using a system of a separate retriever for each terminus unit, the same five installations would require five pairs of telephone lines each 50 miles in length, four additional retriever units together with corresponding dataphone units, and one additional slave output. Due to the extremely high cost of the telephone lines themselves, without the system of this invention, service to these stockbrokers might otherwise be impractical.

The system of this invention has been described with respect to a duplex communication system in which separate communication channels are provided for transmission in opposite directions from each retriever. This duplex system is selected for higher speed transmission. However, this invention may also be used in a half duplex system in which but a single communication channel is used for transmission in opposite directions. Likewise, in the latter case, a sequencing and addressing arrangement is provided to operate with a data terminal equipment (a retriever unit) at one end of the communication channel and a plurality of data terminal equipments (data terminus units) at the other end.

Various modifications of this invention may be made. For example, it has been found desirable to have more than one address associated with a particular data terminus unit so that that unit may be serviced more often by the retriever in running through its cycle with the other terminus units. This is done, for example, by means of the terminal box 902 (FIG. 3) in which by connecting only two of the jumpers to the output terminals, the gate 296 will respond to both addresses in which the jumper is left unconnected. Similarly, by connecting but one of the three jumpers in box 902, the gate 296 will respond to four such addresses. This ability to remove a jumper to attain an address identification stems from the type of gate circuitry; i.e. this circuitry responds either to a low signal on an input line or a floating input line. The same result in various ways may be achieved with other types of gates. With this versatility, the system of FIG. 1 may be adapted to deal with various requirements for servicing stockbrokers. For example, one data terminus may be used for but one or two consoles, while another data terminus may be connected to eight consoles; in this situation, the second such data terminus may have its terminal box 902 arranged to be addressed four times while the first such terminus is addressed but once. Other modifications are within the contemplation of this invention.

Accordingly, a new and improved data communication system is provided that affords a more efficient use of communication channels and an economy in the equipment needed therefor.

What is claimed is:
1. A data retrieval system comprising
 (a) a memory for storing data,
 (b) a plurality of request units,
 (c) data retrieving means and data terminus means remote therefrom connected thereto by request and reply communication channels,
 (d) said data retrieving means including means responsive to requests for obtaining reply data from said memory and means for transmitting corresponding replies,
 (e) said data terminus means including means for connection of a plurality of request units thereto, means responsive to said request units for transmitting requests to said data retrieving means, means for supplying data in corresponding replies to corresponding request units, and means for sequentially enabling request units connected thereto, in which the improvement comprises
 (f) means for connecting a plurality of said remote data terminus means in common to said request and reply communication channels,
 (g) means at said data retrieving means for inserting in a reply to one data terminus means an address of another data terminus means,
 (h) means at said plurality of data terminus means for recognizing in replies to requests from other data terminus means the respective addresses allocated thereto,
 (i) and means responsive to recognition of an address at a data terminus means for transmitting a request of a request unit connected thereto and supplying the corresponding reply thereto.

2. A system according to claim 1 in which said means at the data retrieving means for inserting an address generates addresses of the plurality of data terminus means cyclically in a predetermined sequence for insertion in respective replies.

3. A system according to claim 1 in which said means at a data terminus means for transmitting requests includes a transmit control circuit, said means for sequentially enabling request units includes a sequence control circuit, and said means responsive to recognition of an address includes means for enabling said transmit control circuit and means for setting said sequence control circuit, and including means for disabling said transmit control circuit after the transmission of a request, means responsive to the receipt of a reply after said setting for actuating said sequence control circuit to enable a succeeding request unit after said supplying of reply data to the corresponding request unit, and means for resetting said sequence control circuit after said actuating.

4. A system according to claim 3 in which replies transmitted by said data retrieving means include a synchronizing section, said data retrieving means includes means for inserting a predetermined bit pattern in a portion of the synchronizing section in each reply, and said means for inserting an address generates coded address bit patterns of the plurality of data terminus means cyclically in a predetermined sequence and inserts said patterns in another portion of the synchronizing section of respective replies.

5. A system according to claim 4 in which each data terminus means includes a counter for transmitting requests and means for setting said counter to a predetermined count, and including means responsive to said predetermined bit pattern in a reply for setting said counter to said predetermined count, whereby said setting is produced by replies regardless of different addresses contained therein.

6. A system according to claim 5 in which said means for disabling the transmit control circuit is responsive to a predetermined count of said counter, said means for setting said sequence control circuit is jointly responsive to said recognition of an address and a predetermined count of said counter during a request, said means for actuating the sequence control circuit is responsive to a predetermined count of said counter after the end of a reply, and said means for resetting the sequence control circuit is responsive to a subsequent count of said counter.

References Cited

UNITED STATES PATENTS

| | | | |
|---|---|---|---|
| 3,214,520 | 10/1965 | Avakian et al. | 340—152 X |
| 3,181,121 | 4/1965 | Losch et al. | 340—152 X |
| 3,249,919 | 5/1966 | Scantlin | 340—152 |
| 3,253,263 | 5/1966 | Lee et al. | 340—152 |
| 3,281,788 | 10/1966 | Hernan et al. | 340—152 |
| 3,281,789 | 10/1966 | Willcox et al. | 340—152 |

THOMAS B. HABECKER, *Acting Primary Examiner.*

H. PITTS, *Assistant Examiner.*

UNITED STATES PATENT OFFICE
CERTIFICATE OF CORRECTION

Patent No. 3,359,541                      December 19, 1967

Stanley H. Hunkins et al.

It is hereby certified that error appears in the above numbered patent requiring correction and that the said Letters Patent should read as corrected below.

Column 4, line 42, for "any" read -- an --; line 64, for "indentification" read -- identification --; column 6, line 53, for "to", first occurrence, read -- of --; column 7, line 33, for "inforamtion" read -- information --; column 9, line 39, for "squencer" read -- sequencer --; line 55, for "set is by" read -- is set by --; lines 58 and 59, for "after FF-306 is set. When reset," read -- after reset. When FF-306 is set, --; same line 59, for "(as in gate 904)" read -- (as is gate 904) --; column 10, line 42, for "fro" read -- from --; column 15, line 24, after "units" insert -- for the five brokers, a single retriever unit and dataphone unit --.

Signed and sealed this 11th day of March 1969.

(SEAL)
Attest:

EDWARD M. FLETCHER, JR.                  EDWARD J. BRENNER
Attesting Officer                       Commissioner of Patents